United States Patent [19]
Hayashi et al.

[11] Patent Number: 5,568,638
[45] Date of Patent: Oct. 22, 1996

[54] SPLIT CONTROL SYSTEM FOR A PAGE/PAGE GROUP IN A DATA PROCESSING SYSTEM A PRE-SPLIT PROCESS USING A TEMPORARY OVERFLOW AREA

[75] Inventors: Katzumi Hayashi; Masaaki Mitani; Shinzi Kitao, all of Kawasaki, Japan

[73] Assignee: Fujitsu Limited, Kawasaki, Japan

[21] Appl. No.: 19,566

[22] Filed: Feb. 18, 1993

[30] Foreign Application Priority Data

Feb. 18, 1992 [JP] Japan ................................ 4-030818

[51] Int. Cl.$^6$ .................................................. G06F 17/30
[52] U.S. Cl. ........................................... 395/600; 395/650
[58] Field of Search ..................................... 395/600, 650

[56] References Cited

U.S. PATENT DOCUMENTS

| | | | |
|---|---|---|---|
| 4,677,550 | 7/1987 | Ferguson | 395/600 |
| 4,993,030 | 2/1991 | Krakauer et al. | 395/600 |
| 5,208,899 | 5/1993 | Wheeler et al. | 395/62 |
| 5,307,486 | 4/1994 | Nakamigawa | 395/600 |
| 5,430,869 | 7/1995 | Ishak et al. | 395/600 |
| 5,475,837 | 12/1995 | Ishak et al. | 395/600 |

FOREIGN PATENT DOCUMENTS

| | | |
|---|---|---|
| 1-237854 | 9/1989 | Japan . |
| 4-155547 | 5/1992 | Japan . |

OTHER PUBLICATIONS

Martin, *Computer Data–Base Organization*, 2nd Edition, Part II–Physical Organization, Chapter 20–Indexed Sequen tial Organizations, 1977, 1975 by Prentice–Hall, Inc., Englewood Cliffs, NJ, pp. 351–374.

Date, *An Introduction To Data Base Systems, vol. I*, 4th Edition, Part 1, Chapter 3–The Internal Level, pp. 45–67, no date.

*Primary Examiner*—Thomas G. Black
*Assistant Examiner*—Jack M. Choules
*Attorney, Agent, or Firm*—Staas & Halsey

[57] ABSTRACT

A split control system for a page/page group in a data processing system having a storage structure employing a non-dense B-tree cluster structure, includes: a data base including an index portion and a data portion; the index portion being formed by three layers consisting of the B-tree structure, and the data portion formed by a plurality of upper page groups, and an upper page group used as an overflow area; a record insertion unit for inserting records into the page/page group by using the overflow area in a transaction process, and performing a pre-split process for the page/page group into further pages/page groups by also using the overflow area when there is no vacant space for insertion into the page/page group; and a Demon processing unit operated asynchronously with the transaction process for retrieving a state of use of the overflow area, performing a normal split process for the page/page group when the overflow area is in use, and moving a split page/page group from the overflow area to the page/page group, wherein a timing of a normal split process in the B-tree structure is temporarily delayed by using the overflow area so that it is possible to effectively balance an overhead time of the split process and to improve a response time in the transaction process.

4 Claims, 15 Drawing Sheets

Fig.1 _PRIOR ART_
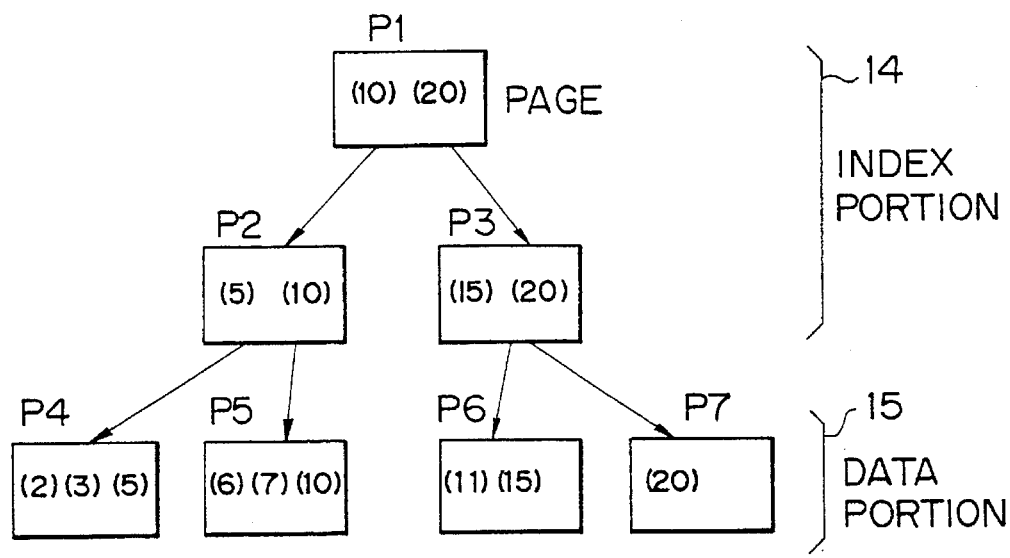
Fig.2 _PRIOR ART_
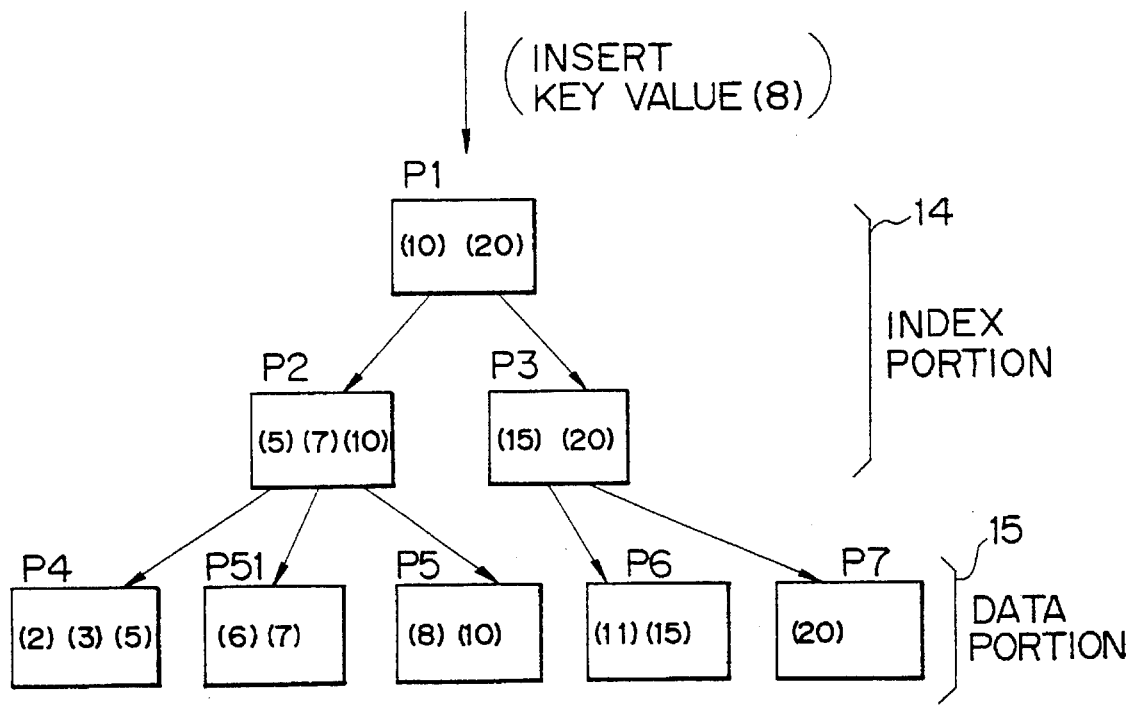

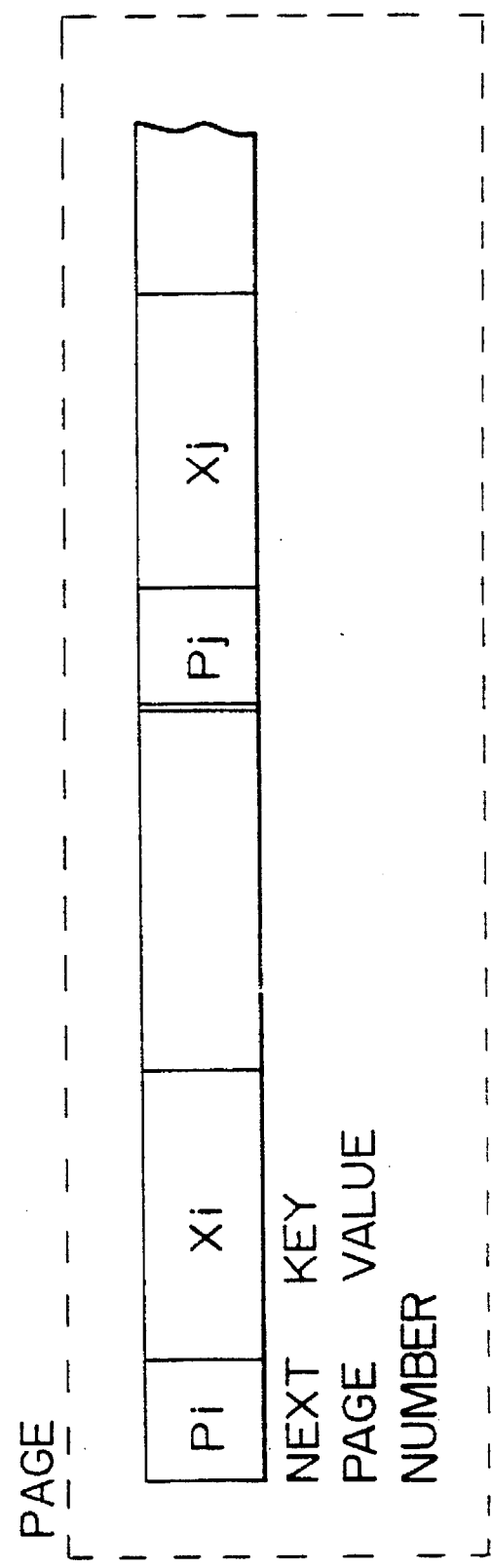

BEFORE SPLIT

AFTER SPLIT

Fig. 21
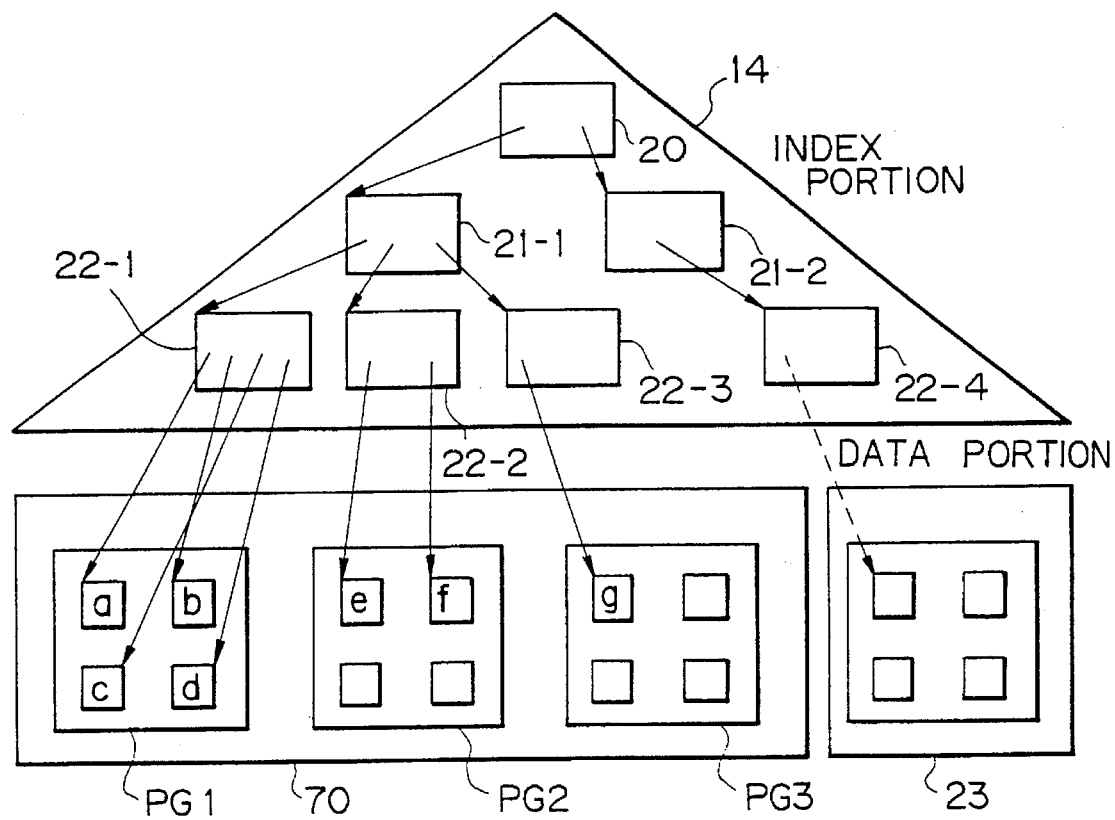
Fig. 22
BEFORE SPLIT
Fig. 23
AFTER SPLIT
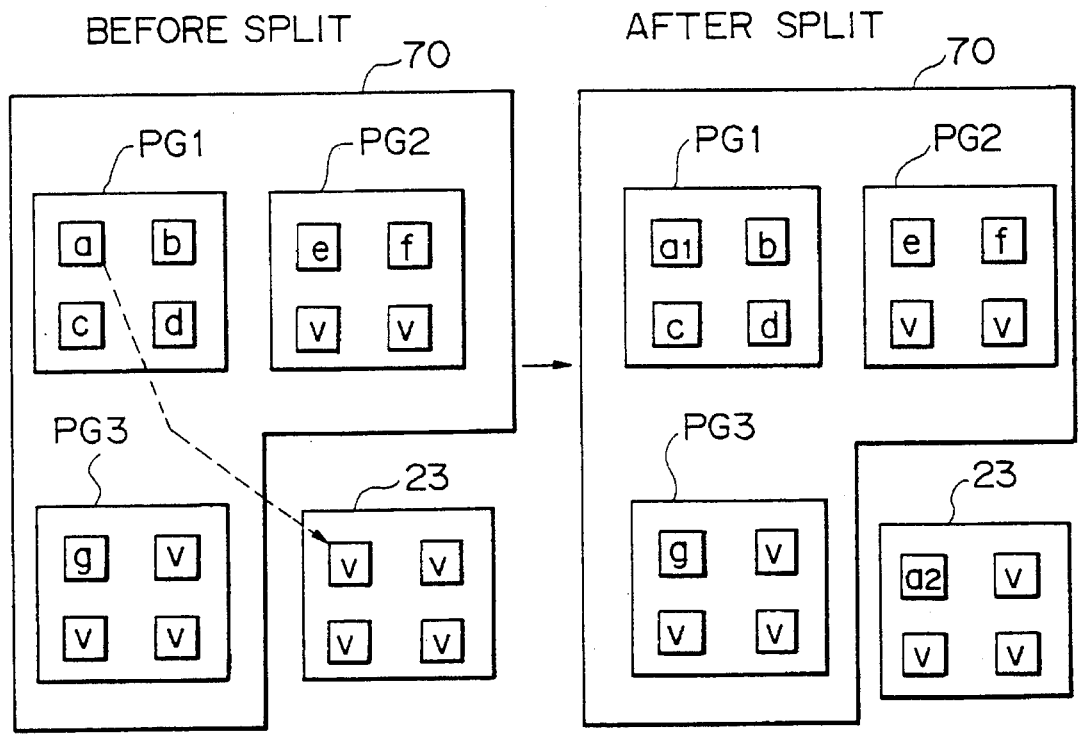

∗ : IN USE

BEFORE DEMON g DELETE

AFTER DEMON

5,568,638

SPLIT CONTROL SYSTEM FOR A PAGE/PAGE GROUP IN A DATA PROCESSING SYSTEM A PRE-SPLIT PROCESS USING A TEMPORARY OVERFLOW AREA

BACKGROUND OF THE INVENTION

1. Field of the Invention

The present invention relates to a split control system for a page/page group in a data processing system, and more particularly, it relates to a split control system for a page or page group in a data processing system which manages data (below, a record) based on a storage structure employing a non-dense B-tree cluster structure. According to the present invention, it is possible to effectively balance an overhead time of a split process so that it is possible to improve a response time and throughput in a transaction process in an entire data processing system.

2. Description of the Related Art

A non-dense B-tree cluster structure is already known as one kind of storage structure in a data base system. The term "non-dense" or "dense" is popular in this field. Briefly, the term "non-dense" means that a maximum/minimum key value of one representative record in a page is shown in an index portion, while, on the contrary, the term "dense" means that a key value is provided for every pointer of the record in the index portion. Further, the term "B-tree" is also popular in this field, and means that the storage structure of a data base has a tree-shaped structure consisting of an index portion and a data portion. The present invention relates to a split control for a page/page group in the "non-dense" and "B-tree cluster structure".

As is known, the term "page" is a unit of storage in a data base, and the terms "page group" and "upper page group" are also units of storage in a data base. In this storage structure of a data base, when a user intends to insert a desired record into a page at an insertion stage, it is necessary to split the page into a plurality of pages when a page into which the record is to be inserted (below, an object page) is filled with other records, i.e., there is no vacant space in the object page. The same split process as above is also required for a page group when an object page group is filled with other data.

However, a large amount of time is required for the above split process for the page or the page group. Particularly, this has a negative influence on the response time of the transaction process during an on-line operation. Accordingly, it is necessary to effectively perform the split process for a page or page group to solve the above problems.

For example, a B-tree structure is described in the following document as a representative storage structure. This structure has an index portion for each page and sequentially retrieves a desired record in accordance with the index. The B-tree structure always maintains the tree-structure even if the page/page group is split.

(reference document):
James Martin, "Computer Data-Base Organization, 2nd edition", 1977, 1975 by Prentice-Hall, Inc. Englewood Cliffs, N.J., Part II Physical Organization, 20 Indexed Sequential Organization.

SUMMARY OF THE INVENTION

The object of the present invention is to provide a split control system for a page/page group in a data processing system enabling an effective balance of overhead time of a split process and improvement in response time in a transaction process in the entire data processing system.

In accordance with the present invention, there is provided a split control system for a page/page group in a data processing system which manages records of the page/page group based on a storage structure employing a non-dense B-tree cluster structure. The split control system includes:

a data base including an index portion and a data portion; the index portion formed by three layers consisting of the B-tree structure having at least one upper page group index, a plurality of page group indexes each operatively connected to the upper page group index, and a plurality of page indexes each operatively connected to corresponding page group index for managing key values of the records; and the data portion formed by a plurality of upper page groups each operatively connected to a corresponding page group index, and an upper page group used as an overflow area;

a record insertion unit operatively connected to the data base for inserting the records into the page/page group by using the overflow area in a transaction process, and performing a pre-split process for the page/page group into a further page/page group by also using the overflow area when there is no vacant space for insertion into the page/page group; and a Demon processing unit operatively connected to the data base and operated asynchronously with the transaction process for retrieving a state of use of the overflow area, performing a normal split process for the page/page group when the overflow area is in use, and a moving a split page/page group from the overflow area to the page/page group;

wherein a timing of a normal split process in the B-tree structure is temporarily delayed by using the overflow area so that it is possible to effectively balance an overhead time of the split process and to improve a response time in the transaction process.

In one preferred embodiment, the split control system further includes:

a page split unit for splitting a page when the page is filled with records;

a page group split unit for splitting a page group when the page group is filled with the records;

an upper page group split unit for splitting an upper page group when the upper page group is filled with the records;

an index unit for accessing the index portion; and a split timing decision unit for determining the timing of the normal split process.

These units are operatively connected to the record insertion unit and Demon processing unit and split timing decision unit is operatively connected to the page split unit, the page group split unit, and the upper page group split.

In another preferred embodiment, the three layers of the B-tree structure correspond to a cylinder, a track and a record area of a magnetic disk apparatus; the upper page group corresponds to the cylinder, the page group corresponds to the track, and the page corresponds to the record area, so that the key values also correspond to the cylinder, the track and the record area, respectively.

In still another embodiment, the Demon processing unit performs a previous split for the page/page group when the page/page group is filled with records in a range of a predetermined utilization rate of the page/page group, wherein it is possible to eliminate an undesirable normal split process in the transaction process.

BRIEF DESCRIPTION OF THE DRAWINGS

In the drawings:

FIGS. 1 and 2 are explanatory views of a conventional split process in a non-dense B-tree structure;

FIG. 3 shows a basic structure of one page;

FIGS. 21 to 23 are explanatory views for a page split process in use of an overflow area;

DESCRIPTION OF THE PREFERRED EMBODIMENTS

Figure 4:
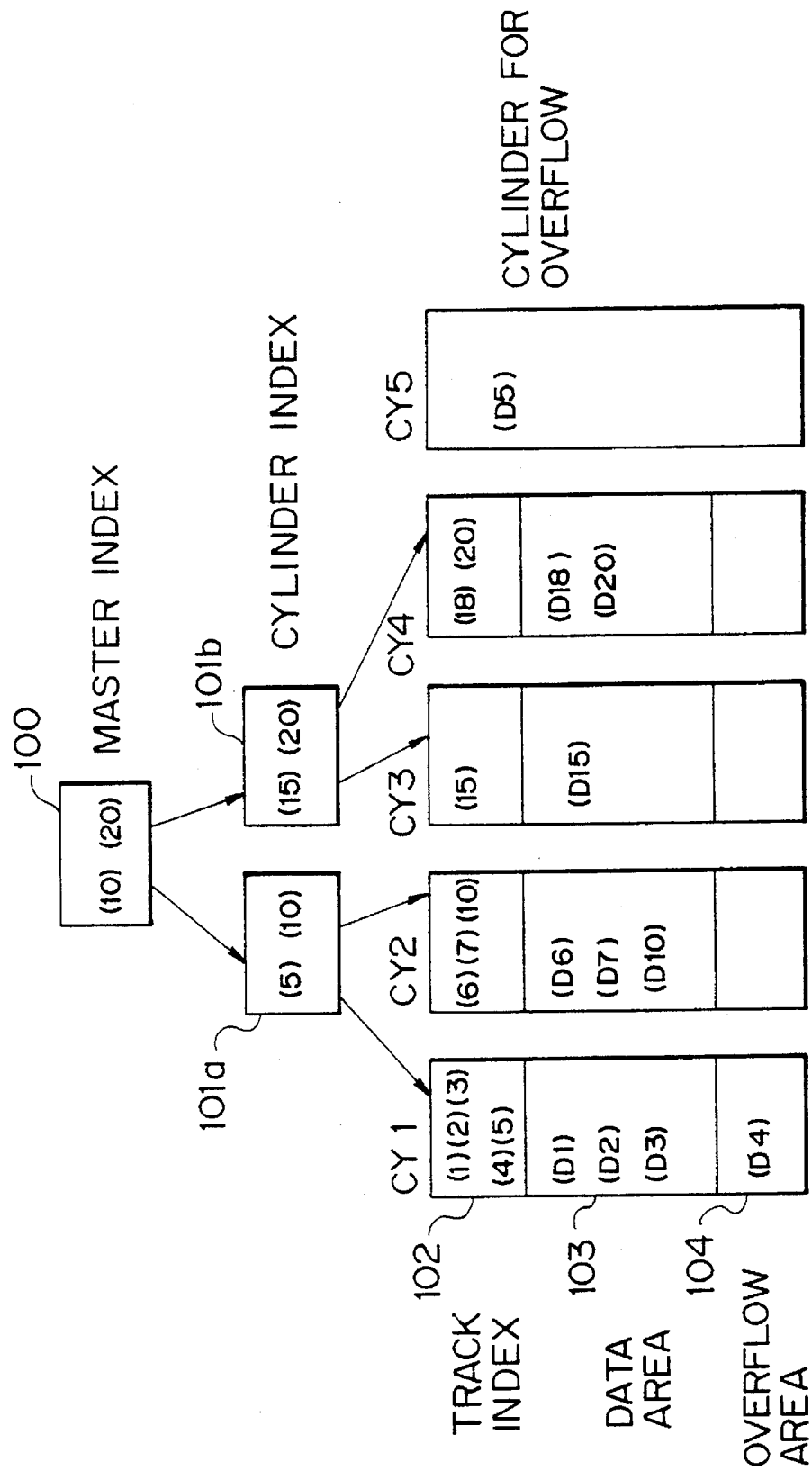
FIG. 4 shows a conventional ISAM structure.

Before describing the preferred embodiments, a conventional split process in a non-dense B-tree structure and its problems will be explained in detail below.

FIGS. 1 and 2 are explanatory views of a conventional split process in a non-dense B-tree structure, and FIG. 3 shows a basic structure of one page. In FIGS. 1 and 2, P1 to P7 denote pages, and numerals (2) to (20) denote key values. The key value is shown in FIG. 3. As shown in FIG. 3, one page is basically formed by a page number area Pi indicating a following page (corresponding to a node of a tree-structure), a key value area Xi applied by record as one kind of address, and a data area Di.

The non-dense B-tree structure is formed by an index portion 14 for storing information to be accessed by a user, and a data portion 15 for storing a record which is actually accessed by the user. All records are sequentially stored in accordance with the key values in the index portion 14 and the data portion 15 so that it is possible to sequentially retrieve a record in accordance with the key value. The index portion 14 holds the maximum key value of each page of the data portion 15 and the pointer to the record so that it is possible to retrieve the key value and a range of the key value. In this case, "range of the key value" is equivalent to "from one key value until another relevant key value".

For example, a non-dense B-tree structure is described in the following document, i.e., C. J. Data, "An introduction to Data base Systems" Volume I Fourth Edition, Part 1. Chapter 3.

As explained above, in the non-dense B-tree structure, when the data cannot be inserted into a page, it is necessary to split the page into a plurality pages. In the drawing, FIG. 1 shows a tree-structure before the key value (8) is inserted, and FIG. 2 shows the tree-structure after the key value (8) is inserted and the page is split.

In the state shown in FIG. 1, it is assumed that the index portion 14 receives a request to insert the record having the key value (8) from the user. To investigate which page this record should be inserted, first, the index of the page P1 is retrieved, and next, the index of the page P2 is retrieved. In this case, since the page P2 includes the records having the key values (5) and (10), it is obvious that the corresponding page, in which the key value (8) should be inserted, is the page P5. However, since the page P5 is already filled with the records having the key values (6), (7) and (10), it is impossible to insert a new record. Accordingly, the page P5 is split into two pages as shown by FIG. 2.

In FIG. 2, as a result of the split, the page P5 is split into the page P5 and a page P51. Since the page P51 is newly provided, the pointer (7) of the new page P51 is added to the page P2 of the index portion 14. Further, the record of the key value (8) is inserted into the page P5 so that the process of splitting the page is completed.

As is obvious from the above conventional method, the user, who requests the insertion of the record having the key value (8), must wait until the process of splitting the page P5 is completed and the index of the page is updated. This means that the split process is always required in the above conventinal method when a situation regarding a page to be split exists. Accordingly, this split process has a negative influence on the response time.

Further, in an on-line data processing system, it is necessary to realize a balance of the response time in the entire system. However, as mentioned above, the non-dense B-tree structure maintains its tree-structure for every split process. This means that the split process is an essential requirement for maintaining the B-tree structure. However, the split process has an undesirable influence on achieving the balance of the response time in the entire system because this process requires much more time than other processes.

FIG. 4 shows a conventional ISAM structure. The ISAM (Indexed Sequential Access Method) is another known conventional method, and this method uses an overflow area instead of the split process. The ISAM is described in the document by "James Martin" mentioned above.

In FIG. 4, reference number 100 denotes a master index, 101a and 101b denote cylinder indexes each having cylinder information corresponding to the key value, 102 denotes a track index in each cylinder, 103 denotes a data area for storing actual records, and 104 denotes an overflow area used when the data area is filled with records. Further, CY1 to CY5 denote cylinders, for example, a magnetic disk. In this case, the cylinder CY5 is used as the overflow area. Reference numerals (1) to (20) denote index numbers, and (D1) to (D20) denote data.

In the ISAM, there is no overhead caused by the process of splitting the non-dense B-tree structure. However, when the overflow area 104 of each cylinder or the cylinder CY5 is frequently used for inserting many key values each of which has a closed key value, these areas 104 and CY5 are frequently used so that, when accessing those areas, the response time is increased and efficiency of use of space in the data area also becomes worse in the entire system.

Still another method has also been proposed. This method employs a batch process for the overflow area and the split process in the B-tree structure. That is, the overflow area in the ISAM and the split process in the B-tree structure are used by the batch process. According to the batch process, the overflow area is used for a record which is split from the page, and the split process is periodically performed at predetermined time intervals to maintain the B-tree structure.

In this method, however, a normal service, for example, a retrieval service to the data base is stopped during the above batch process so that throughput of the system drops.

Accordingly, for a data processing system which manages records based on a storage structure using a non-dense B-tree cluster structure, the object of the present invention is to provide a split control system for a page/page group in which it is possible to effectively balance an overhead time of a split process so that it is possible to improve a response time and throughput in a transaction process in the entire data processing system.

Figure 5:
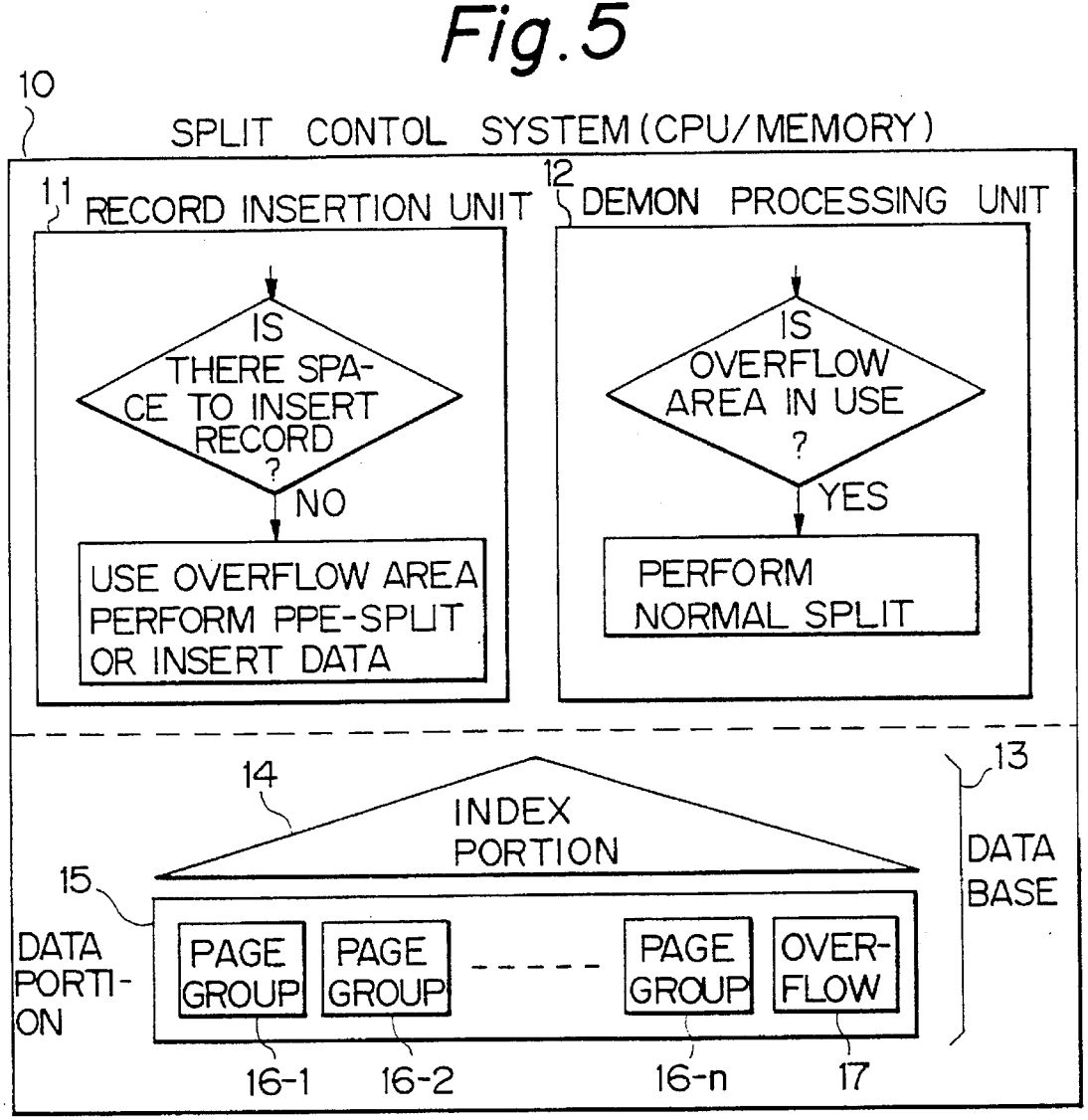
FIG. 5 shows a basic structure of a split control system according to the present invention.
Figure 6:
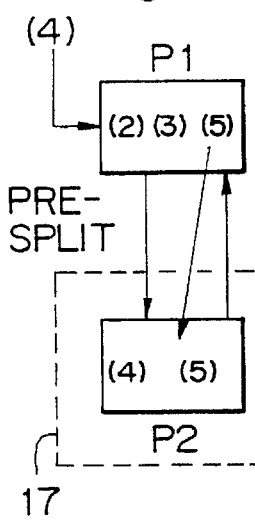
FIGS. 6 to 8 show a split process of the present invention.
Figure 7:
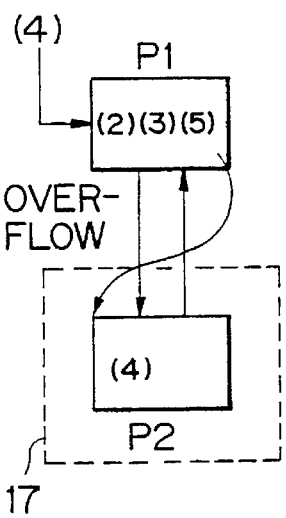
Figure 8:
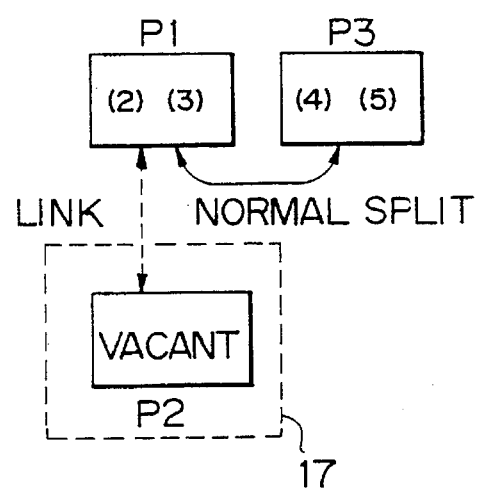

FIG. 5 shows a basic structure of a split control system according to the present invention, and FIGS. 6 to 8 show a split process of the present invention. In FIG. 5, reference number 10 denotes a split control system in a data processing system including a central processing unit and a main storage. The split control system 10 includes a record insertion unit 11 for inserting a record in the transaction process, a Demon processing unit 12 for operating asynchronously with the transaction process in a background process, and a data base 13.

The data base 13 includes an index portion 14 for managing the key value of the B-tree and a data portion 15 for storing record to be accessed by the user. The data portion 15 has a plurality of page groups 16-1 to 16-n and a page group 17 for the overflow area. Each page group is formed by a plurality of pages each having closed key values as explained below. The overflow area 17 is temporarily used and this area is returned by the Demon processing unit 12 to the vacant state so that the overflow occurs only on the main storage.

The record insertion unit 11 determines whether or not there is a space available to insert a record in the insertion stage of the transaction process. When there is no space (NO), the record insertion unit 11 inserts the record into the overflow area by using a page split or a page link process.

The Demon processing unit 12 determines whether or not the overflow area is used. When the overflow area is in use (YES), the Demon processing unit 12 moves the record stored in the overflow area 17 to the normal page of the B-tree structure so as to return the overflow area 17 to the vacant state. In this case, the "Demon process" is well-known in this field, and this process is performed as a background process asynchronously with the transaction process of the on-line process. In the present invention, the timing of the normal split process is delayed by using the overflow area to ensure the balance of the response time in the entire system.

The operation of FIGS. 6 to 8 is explained below. First, the operation in the record insertion unit 11 is explained in detail below with reference to FIGS. 6 to 8. The page P1 is filled with three records having the key values (2), (3) and (5) as shown in FIG. 6. In this state, it is assumed that the user requests the insertion of the record having the key values (4). In the record insertion unit 11, the record having the key value (4) is temporarily stored in the page P2 which is provided in the overflow area 17, and the page P2 is linked with the page P1 as shown in FIGS. 6 and 7. As a result, the record having the key value (4) is inserted into the transaction process.

Further, the record insertion unit 11 takes the vacant page P2 from the overflow area 17, and performs a pre-page split ("pre-split" means the split process performed in the record insertion unit) of the vacant page P2. Further, the record insertion unit 11 stores the record having the key values (2) and (3) into the page P1, and stores the record having the key value (4) and the record having the key value (5) into the page P2 as shown in FIG. 6.

Next, the Demon processing unit 5 performs a normal page/page group split process as shown in FIG. 8 to maintain the B-tree structure. That is, as shown in FIG. 8, the record having the key value (4) is stored in the new page P3 with the record having the key value (5) in the normal split process, and the page P2 in the overflow area 17 is returned to the vacant area.

Figure 9:
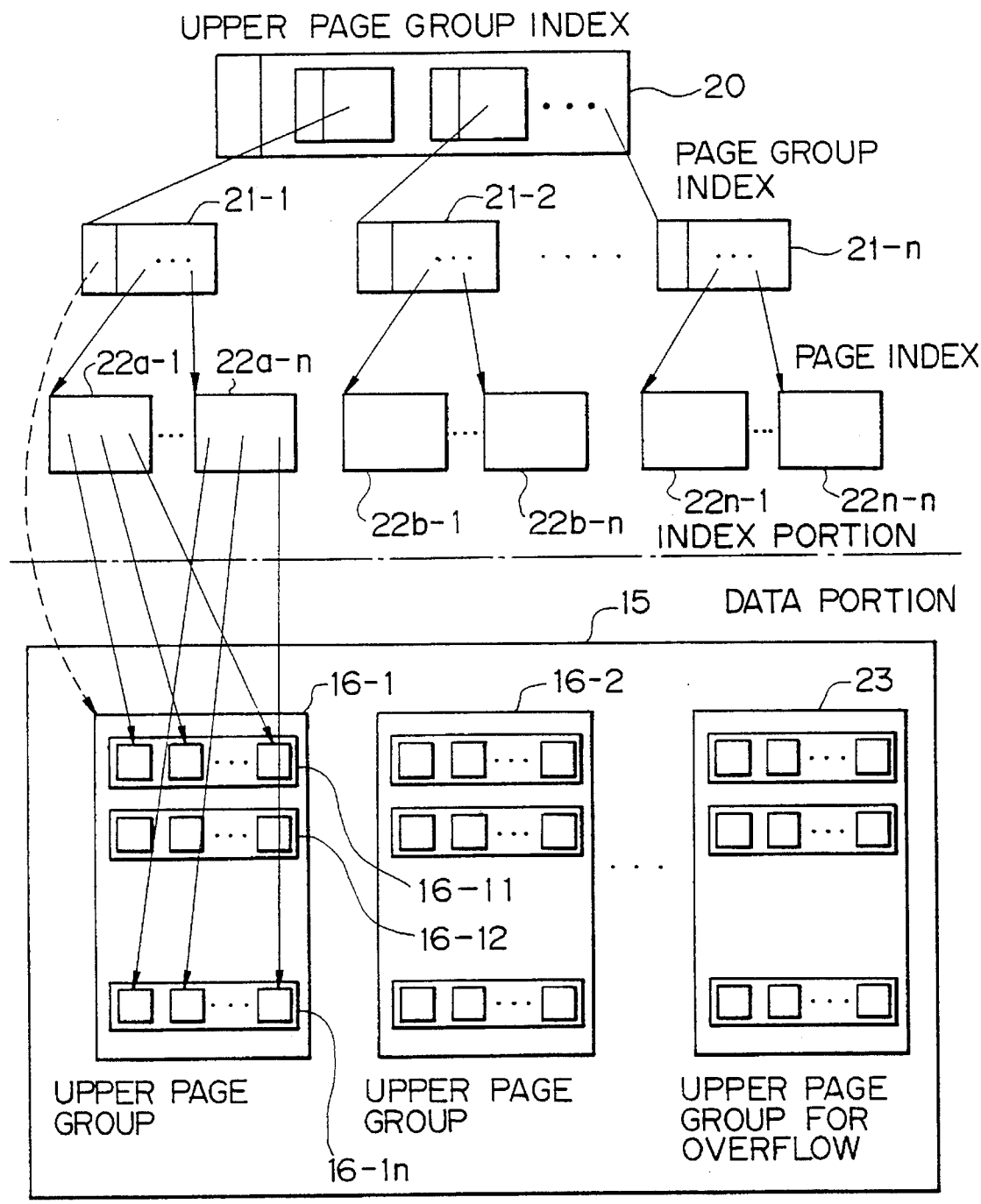
FIG. 9 shows a storage structure of a non-dense structure according to an embodiment of the present invention.

FIG. 9 shows a storage structure of the non-dense structure according to an embodiment of the present invention. In the index portion, reference number 20 denotes an upper page group index, 21-1 to 21-n denote page group indexes, and 22a-1 to 22a-n, 22b-1 to 22b-n and 22n-1 to 22n-n denote page indexes.

In the data portion, 16-1 to 16-2 denote upper page groups, and 23 denotes an upper page group used as the overflow area. Further, each upper page group 16 has a plurality of page groups 16-11 to 16-1n. As shown in the drawing, for example, the page group index 22a-1 in the index portion corresponds to the upper page group 16-11 of the data portion, and the page index 22a-n corresponds to the page group 16-1n.

The basic structure of this embodiment has two structures, i.e., a clustering unit in which records having sequentially closed key numbers are provided in the same page, and the vacant area for the overflow. That is, the clustering unit in the index portion corresponds to the page group of the data portion. For example, as mentioned above, the page index 22a-1 corresponds to the page group 16-11, and the page index 22a-n corresponds to the page group 16-1n. Each page group 16-11 to 16-1n is formed by a plurality of pages, and at least one of the pages remains as the vacant page to perform the page split process.

In this case, the upper page group 16 can hold a page group in which all pages therein are vacant, and this vacant page group having all vacant pages is utilized for the page split/page group split process in the upper page group. The page index 22a-1 to 22a-n corresponds to corresponding page group 16-11 to 16-1n, and manages the vacant page in the process, the page in use and the reserved page in each page group as explained below. In this case, the phrase "vacant page in the process" means that the page filled with records is changed to the vacant page after all records are deleted. Further, the phrase "page in use" means that the page is filled with records, i.e., the page is in use.

Similarly, the page group index 21-1 corresponds to the upper page group 16-1, and manages the vacant page group in the process, the page group in use and the reserved page group in each upper page group. Vacant page management is performed by using the pointer in the page/page group index portion.

Figure 10:
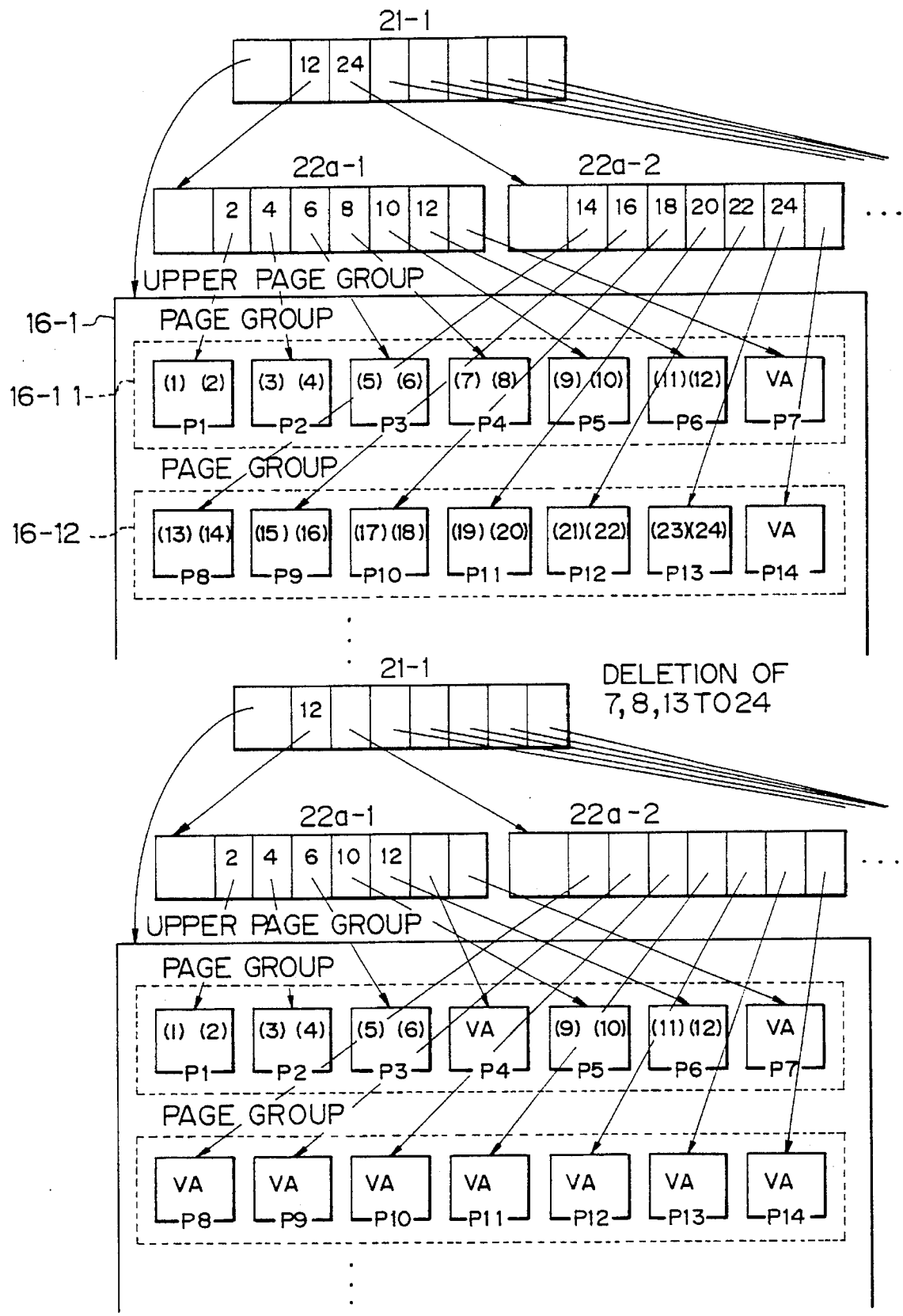
FIG. 10 is an explanatory view of a vacant page/page group in FIG. 9.

FIG. 10 is an explanatory view of a vacant page/page group in FIG. 9. Assuming that two page groups 16-11 and 16-12 include records having the key values (1) to (24), one page group 16-11 has pages P1 to P7, and the other has pages P8 to P14. The page in use is shown by the pages P1 to P6 and P8 to P13 which are filed with records. The reserved page is shown by P7 and P14 which are previously reserved in an initial stage of the process. In this case, when any one of pages P1 to P6 is splitted, the page P7 is used as the vacant page VA. When any one of pages P8 to P13 is split, the page 14 is used as the vacant page VA. The vacant page in the process is shown by the page P4. This page P4 occurs when the records having the key values (7) and (8) are deleted. Further, when the records having the key values (13) to (24) are deleted, the vacant pages in the process are shown by the pages P8 to P14.

Figure 11:
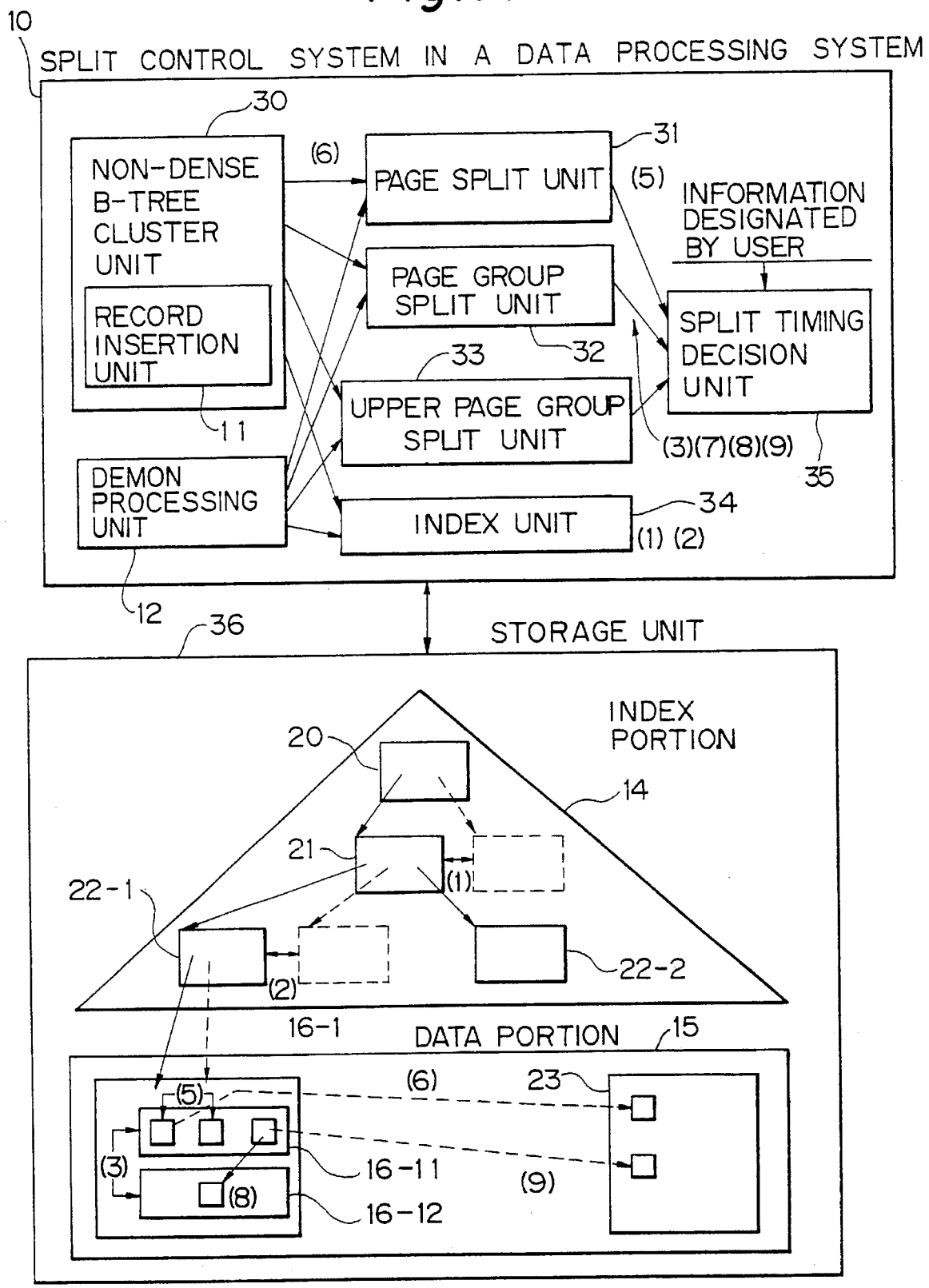
FIG. 11 shows a structure of one embodiment of the present invention.

FIG. 11 shows a structure of one embodiment of the present invention. In the split control system 10, reference number 30 denotes a non-dense B-tree cluster unit having a function of accessing the non-dense B-tree structure, and further includes a record insertion unit 11 for inserting a record requested by a user; 31 denotes a page split unit for splitting a page when the page is filled with records, i.e., there is no vacant space in the page; 32 denotes a page group split unit for splitting a page group when the page group has no vacant space; 33 denotes an upper page group split unit for splitting the upper page group when the upper page group has no vacant space; 34 denotes an index unit; and 35 denotes a split timing decision unit for determining the timing of the split process when the user designates a record.

Further, the storage unit 36 includes the index portion 14 and the data portion 15, and these structures are already shown in FIG. 5. The non-dense B-tree cluster unit 30 performs insertion/reference of record. However, when a plurality of records each having closed key value are inserted, a plurality of records are inserted into the same page so that such page is filled with records. Accordingly, the page split unit 31 performs the page split process as shown by (5). When the page split is completed, the index processing unit 34 updates the index in the page index portion.

Basically, it is required to have a vacant page in the page group to perform the page split. However, when there is no vacant page in the page group, the page group split unit 32 performs the split process of the page group by using the vacant page group in the upper page group. In this case, when the split timing decision unit 35 determines that it is impossible to perform the normal split process, the record insertion unit 11 performs the overflow of the record into the overflow area, or performs the split process using the overflow area 23.

The overflow area 23 is provided as the temporary area for temporarily performing the split process in the Demon processing unit 12 instead of the normal split process in the transaction process. The overflow area 23 is used when an overflow occurs in the transaction process. As explained above, since the overflow area is changed to the state in which is not in use after the Demon process, basically, it is not necessary to provide this area on the secondary storage. However, in the present invention, the overflow area is also provided in the secondary storage to provide against an accidental crash of the system.

Figure 12:
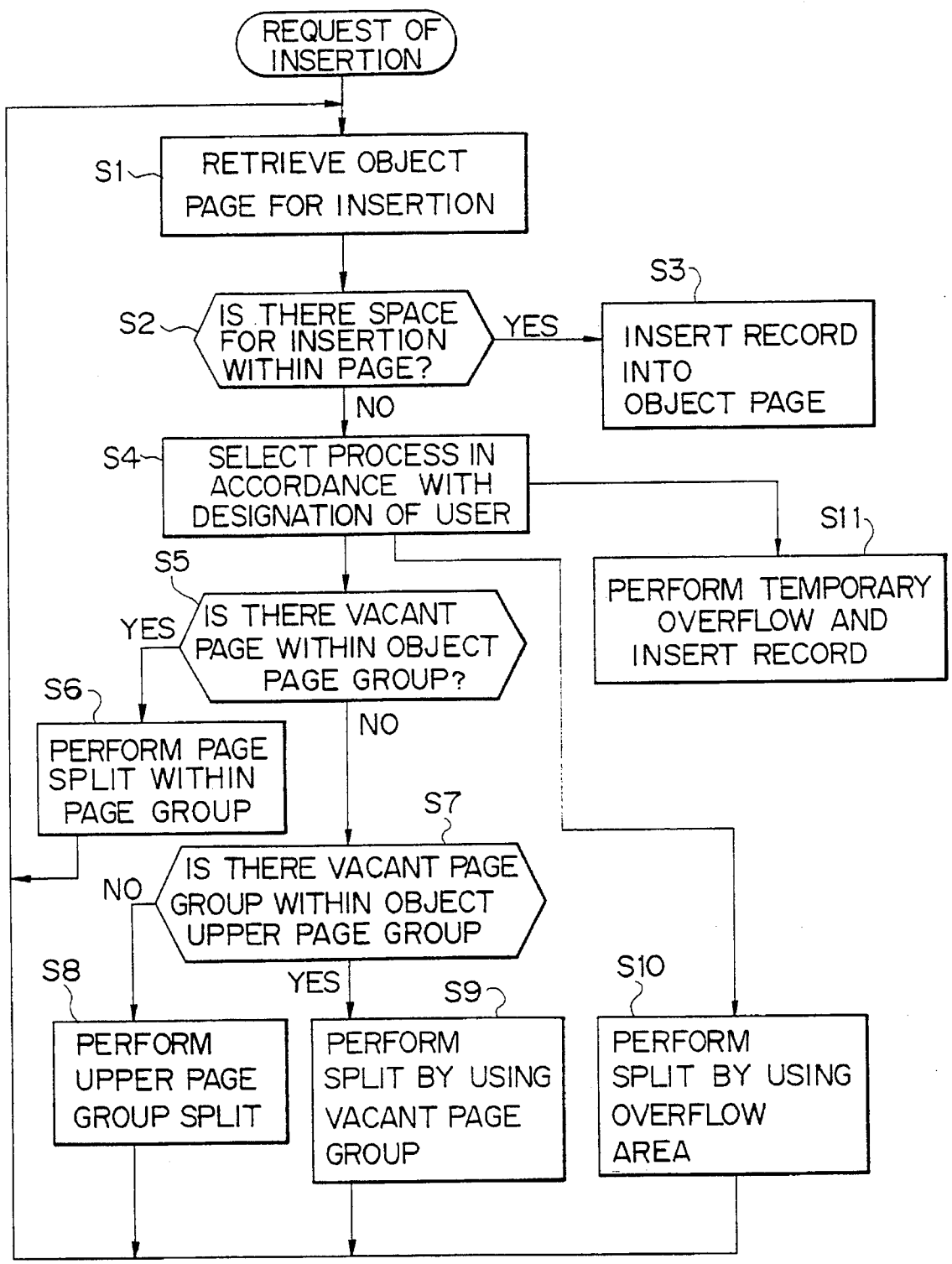
FIG. 12 is a flowchart of an insertion stage of a record.

FIG. 12 is a flowchart of an insertion stage of a record.

(S1) The record insertion unit 11 retrieves the page to be inserted (below, object page) based on the key value when the user requests the insertion of the record.

(S2) The record insertion unit 11 investigates whether or not there is space (a vacant page) into which the record can be inserted within the object page. When there is no space to insert the record (NO), the process goes to the step S4.

(S3) When there is space (YES in step S2), the record is inserted into the object space. When the split timing decision unit 35 selects a previous split process, it determines whether or not a utilization rate of the object page is set to a previous split rate designated by the user, and when the utilization rate is set to the designated previous split rate, the split decision unit 35 sends a previous split trigger to the Demon processing unit 12. The terms "previous split", "utilization rate" and "previous split rate" used above are explained briefly below. That is, the user can previously designate the utilization rate of the page as the previous split rate. In this case, the page is split when it is filled with records until the previous split rate without waiting for the overflow state of the page. Accordingly, the split decision unit 35 must select whether or not the previous split rate is designated.

(S4) When there is no space (NO in step S2), the split timing decision unit 35 determines the split timing in accordance with the designation of the user. In this embodiment, it is possible to select either that the split process is immediately performed by the record insertion unit 11, or that the split process is performed by the Demon processing unit 12. When the split process is performed by the Demon processing unit 12, it is possible to select either that the split process is performed by using the overflow area on the main storage, or that only the record is pre-split on the overflow area of the main storage.

(S5) When the split process is immediately performed by the record insertion unit 11, this process is the same as the conventional one as explained above. That is, the record insertion unit 11 investigates whether or not there is a vacant page within the object page group.

(S6) When there is a vacant page (YES in step S5), the page split process is performed in the page group, and the process returns to the step S1.

(S7) When there is no vacant page (NO in step S5), the record insertion unit 11 investigates whether or not there is a vacant page group within the upper page group.

(S8) When there is no vacant page group (NO in step S7), the split process is performed in the upper page group, and the process returns to the step S1.

(S9) When there is a vacant page-group (YES in step S9), the split process is performed in the vacant page group (i.e., page group split), and the process returns to the step S1.

(S10) When the split timing decision unit 35 selects the split process by using the overflow area, the record insertion unit 11 performs the pre-split process by using the overflow area of the main storage, and sends a trigger indicating use of the temporary overflow to the Demon processing unit 12.

(S11) When the split timing decision unit 35 selects the overflow of the main storage, the record insertion unit 11 inserts the record in the overflow area of the main storage, and sends the trigger indicating use of the temporary overflow to the Demon processing unit 12.

In the above case, many records are inserted on the on-line process so that there are no vacant overflow areas in steps S10 and S11. In this case, the split process is performed in the transaction process.

As explained above, when the record insertion unit 11 obtains the overflow area and generates the trigger, the Demon processing unit 12 starts to perform the Demon process when the trigger is input from the record insertion unit 11. The operation of the Demon processing unit 12 is explained in detail below.

Figure 13:
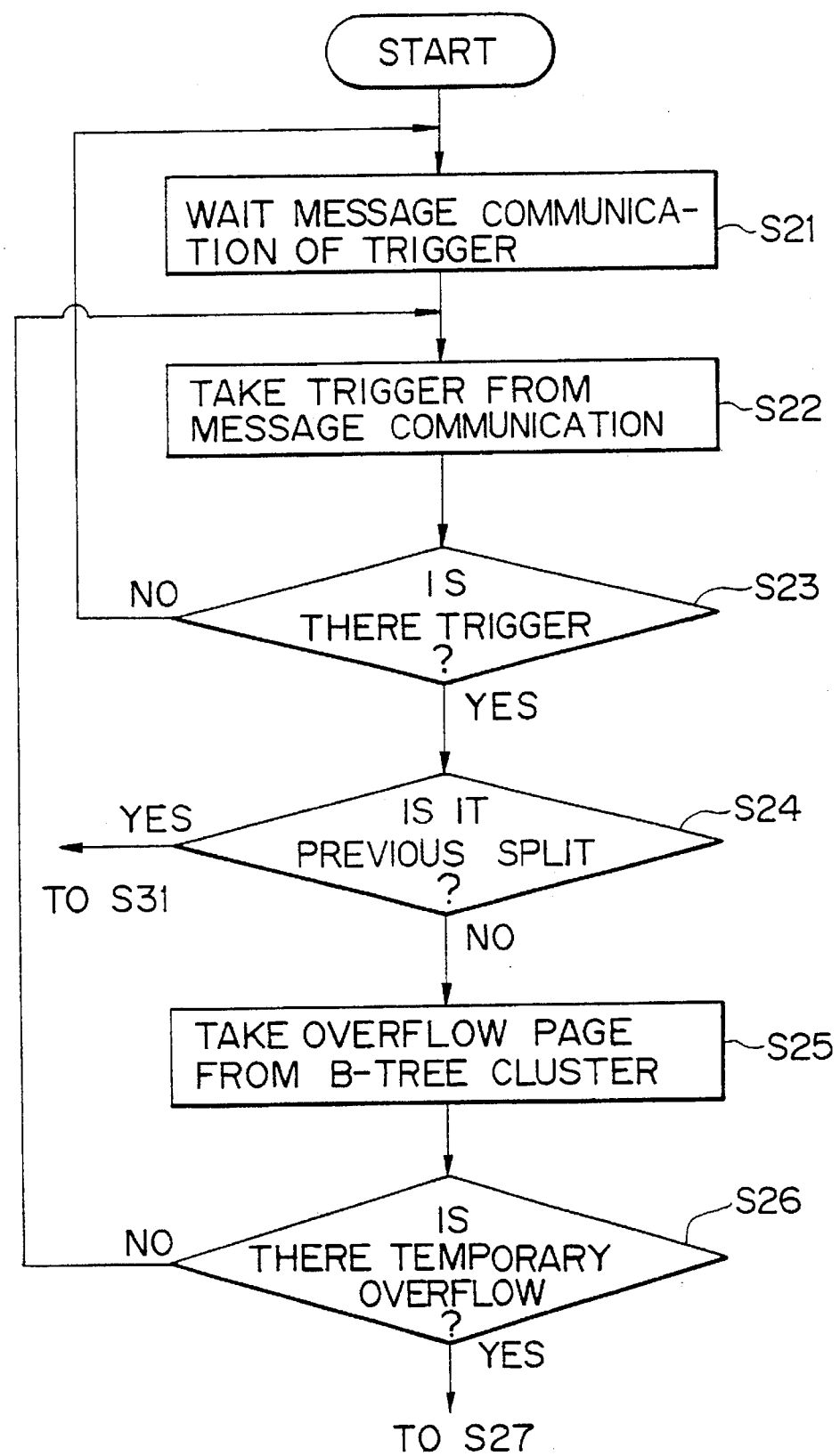
FIGS. 13 and 14 are flowcharts explaining an operation in a Demon processing unit.
Figure 14:
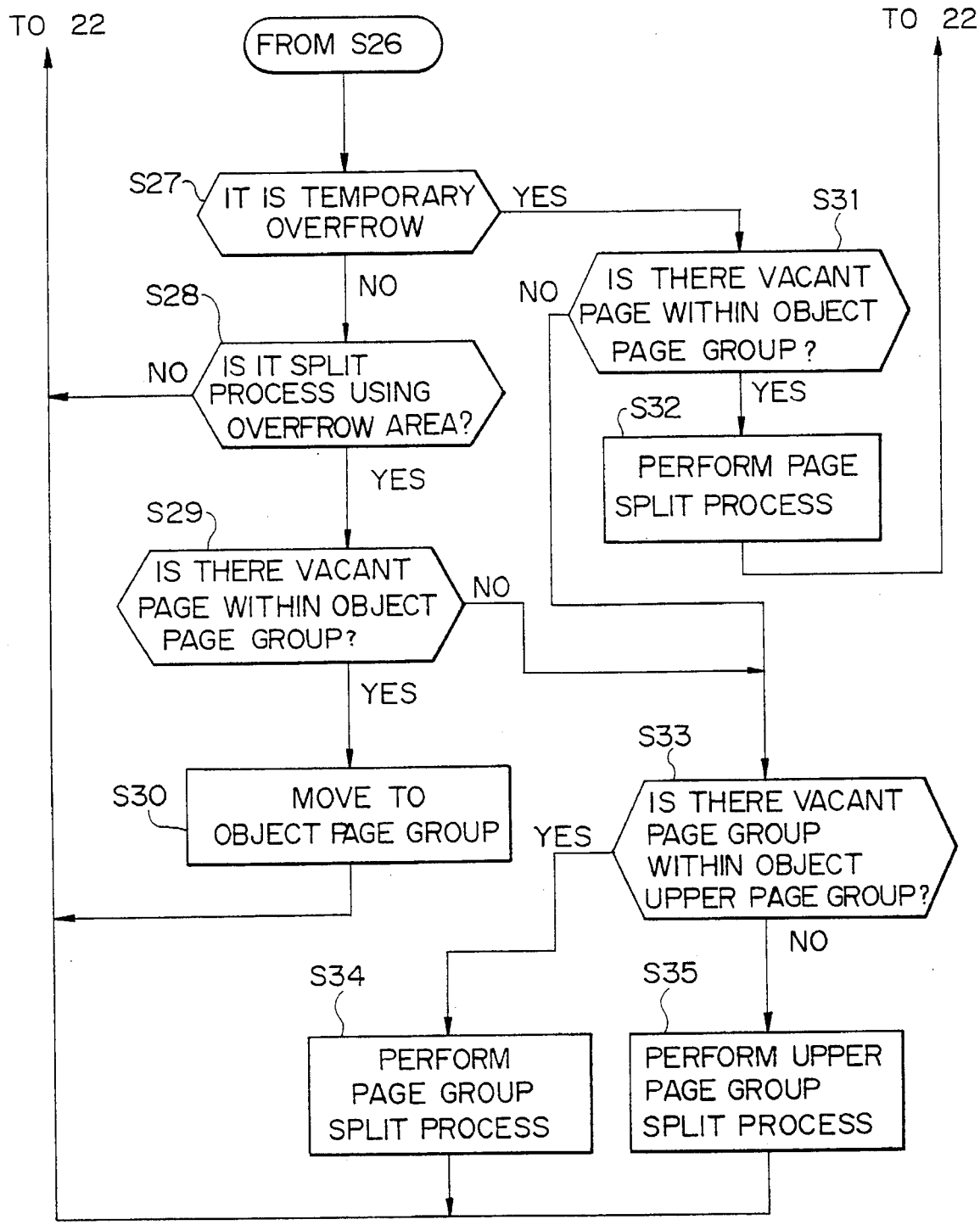

FIGS. 13 and 14 are flowcharts explaining the operation in the Demon processing unit 12.

Figure 27:
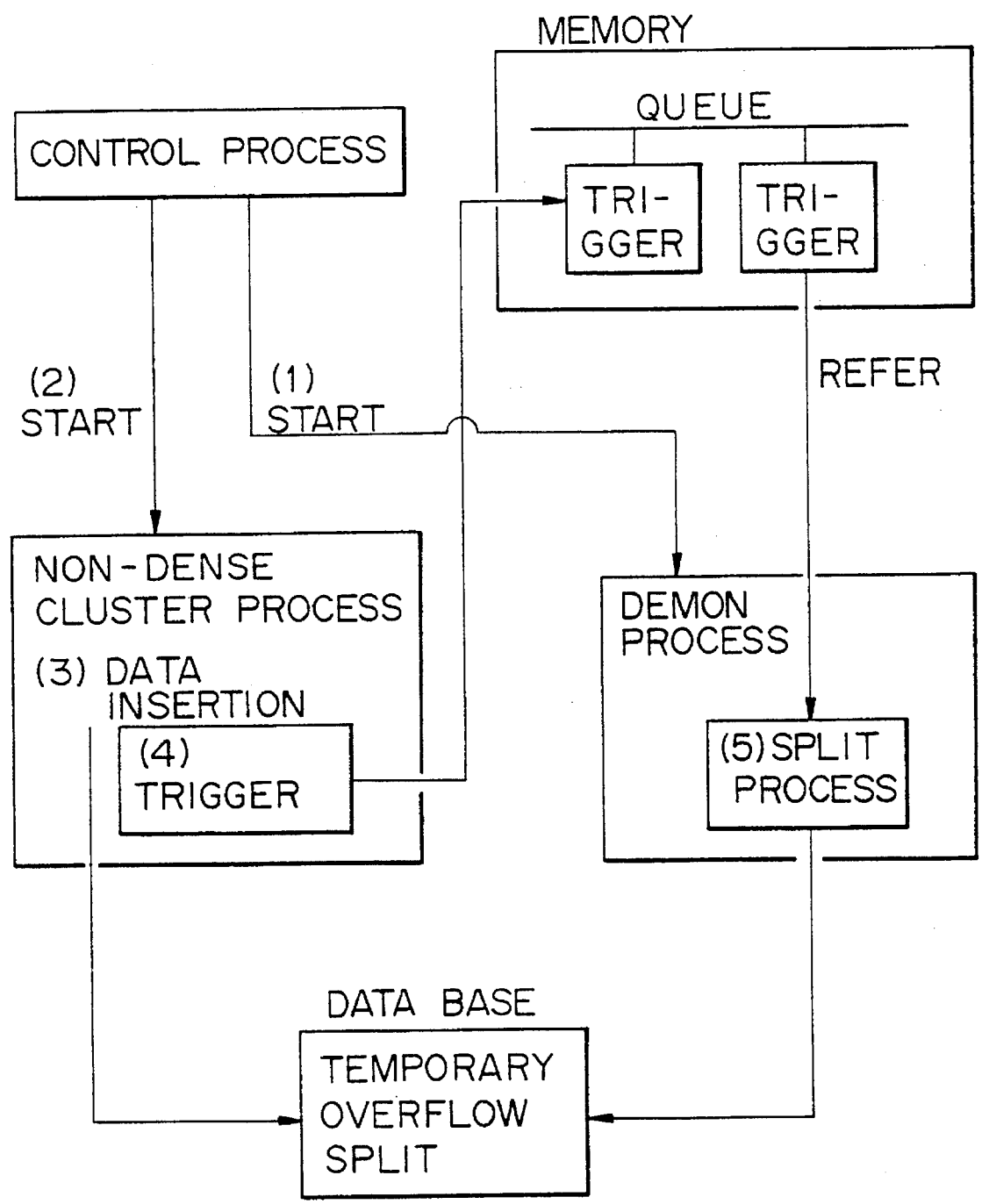
FIG. 27 is an explanatory view for a relationship between a non-dense cluster process and a Demon process.

In FIG. 13, (S21) The Demon processing unit 12 waits for a message communication including the trigger from the record insertion unit 11. The triggers are sequentially transferred from the record insertion unit so as to form "queue" as shown in FIG. 27.

(S22) The Demon processing unit 12 takes the trigger from the queue.

(S23) When there is no trigger (NO) in the message communication, the process returns to the step S21. When there is a trigger (YES), the process goes to the step S24.

(S24) When the request from the record insertion unit 11 indicates the previous split process ("previous split process" is defined above), the process goes to the step S31. When it does not indicate the previous split process, the process goes to the step S25.

(S25) When it is no previous split process (NO) in step S24, the Demon processing unit 12 temporarily takes the overflow page from the non-dense B-tree cluster.

(S26) When there is no temporary overflow in the non-dense B-tree cluster (NO), the process returns to step S22. When there is a temporary overflow (YES), the process goes to step S27.

In FIG. 14, (S27) The Demon processing unit 12 determines whether or not it is the temporary overflow of a record in the case of use of the overflow area of the main storage. When it is the overflow state (YES), the process goes to step S31.

(S28) When it is not he overflow state (NO), the Demon processing unit 12 determines whether or not it is the pre-split process in the case of use of the overflow area of the main storage. When it is not the pre-split process, the process returns to step S22.

(S29) When it is the pre-split process in use of the overflow area (YES in step S28), the Demon processing unit 12 investigates whether or not there is a vacant page within the object page group. When there is no vacant page (NO), the process goes to the step S33.

(S30) When there is a vacant page (YES in step S29), the record in the overflow area is moved to the object page group. After this movement of the record, the process goes to the step S22.

(S31) When it is the overflow state (YES in step S27), the Demon processing unit 12 investigates whether or not there is a vacant page within the object page group. When there is no vacant page (NO), the process goes to the step S33.

(S32) When there is a vacant page (YES in step S31), the Demon processing unit 12 performs the split process to the vacant page, and the process returns to the step S22.

(S33) When there is no vacant page (NO in steps S29 and S31), the Demon processing unit 12 investigates whether or not there is a vacant page group within the upper page group.

(S34) When there is a vacant page group within the upper page group (YES in step S33), the Demon processing unit 12 performs the split process for the page group, and the process returns to the step S22.

(S35) When there is no page group within the upper page group (NO in step S33), the Demon processing unit 12 performs the split process for the upper page group, and the process returns to the step S22.

Figure 15:
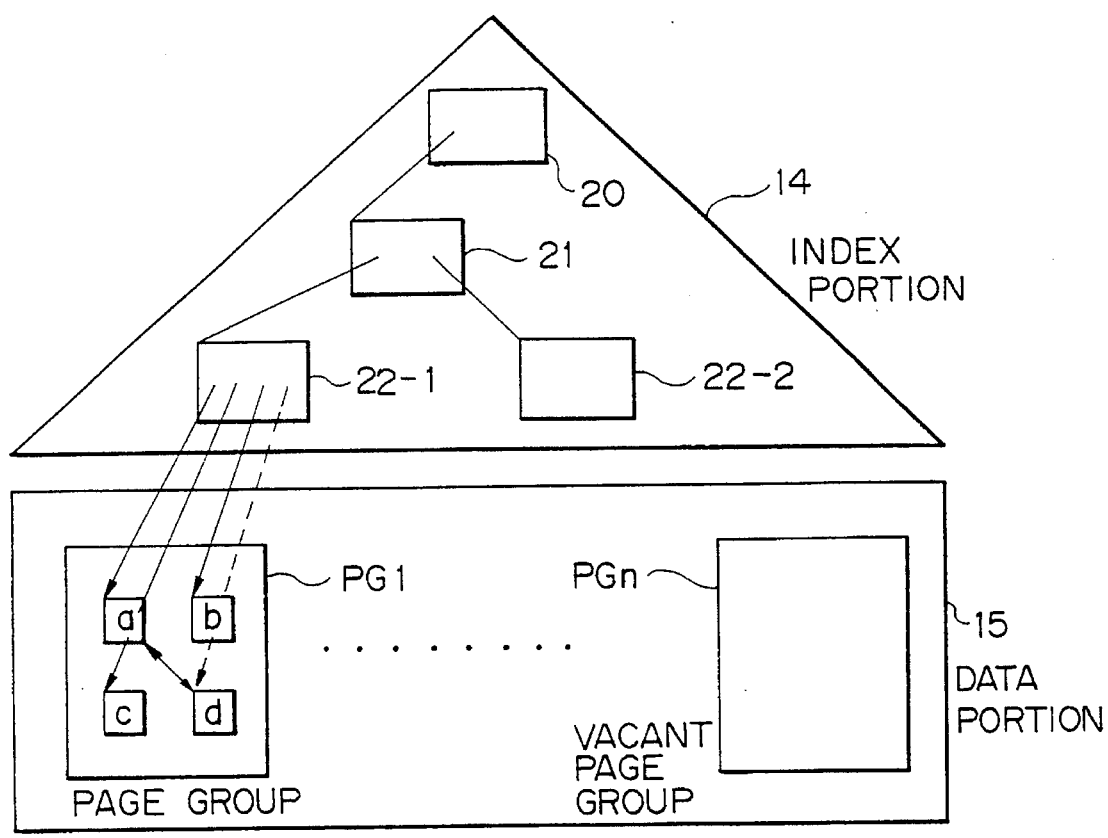
FIGS. 15 to 17 are explanatory views for a page split process within a page group.
Figure 16:
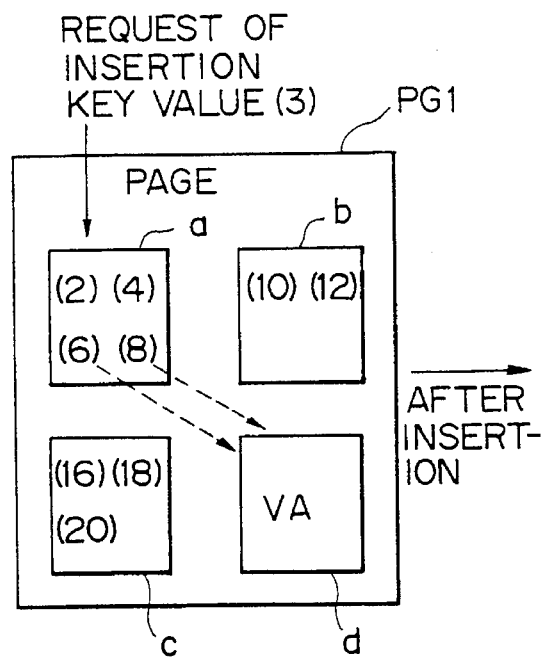
Figure 17:
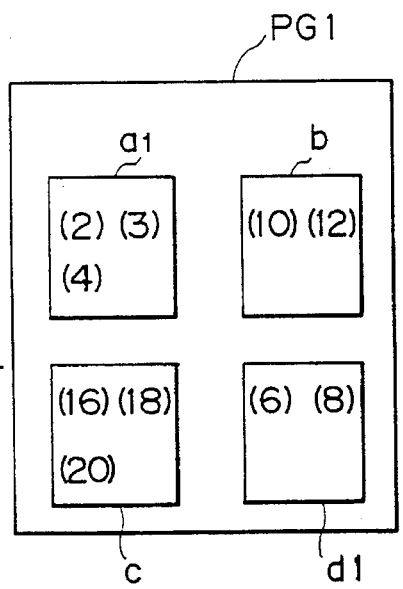

FIGS. 15 to 17 are explanatory views for a page split process within the page group. FIG. 15 corresponds to the data base 13 in FIG. 5. FIG. 16 shows the page group before the page split process, and FIG. 17 shows the page group after the page split process. In FIGS. 16 and 17, numerals denote the key value of the corresponding record. In FIG. 15, as shown in FIG. 9, reference number 20 denotes the upper page group index, 21 denotes the page group index, and 22 denotes a page index. In the page group PG1, "a" to "d" denote the pages. Further, PGn denotes the vacant page group.

In FIG. 16, assuming that the user requests the insertion of the record having the key value (3) into the page "a" through the record insertion unit 11. In this case, the page "a" is already filled with the records having the key values (2), (4), (6) and (8) so that there is no vacant area in the page "a". However, since there is a vacant page "d" (VA) in the page group PG1, it is possible to perform the page split in the page group PG1. Accordingly, the page "a" is split into the page "a1" and the page "d1". After insertion, the page "a1" includes the records having the key values (2), (3) and (4), and the page "d1" includes the record having the key values (6) and (8) as shown in FIG. 17. As a result, since the page is increased by the page "d1", the maximum key value, i.e., the key value (8), is placed in the page index 22-1.

Figure 18:
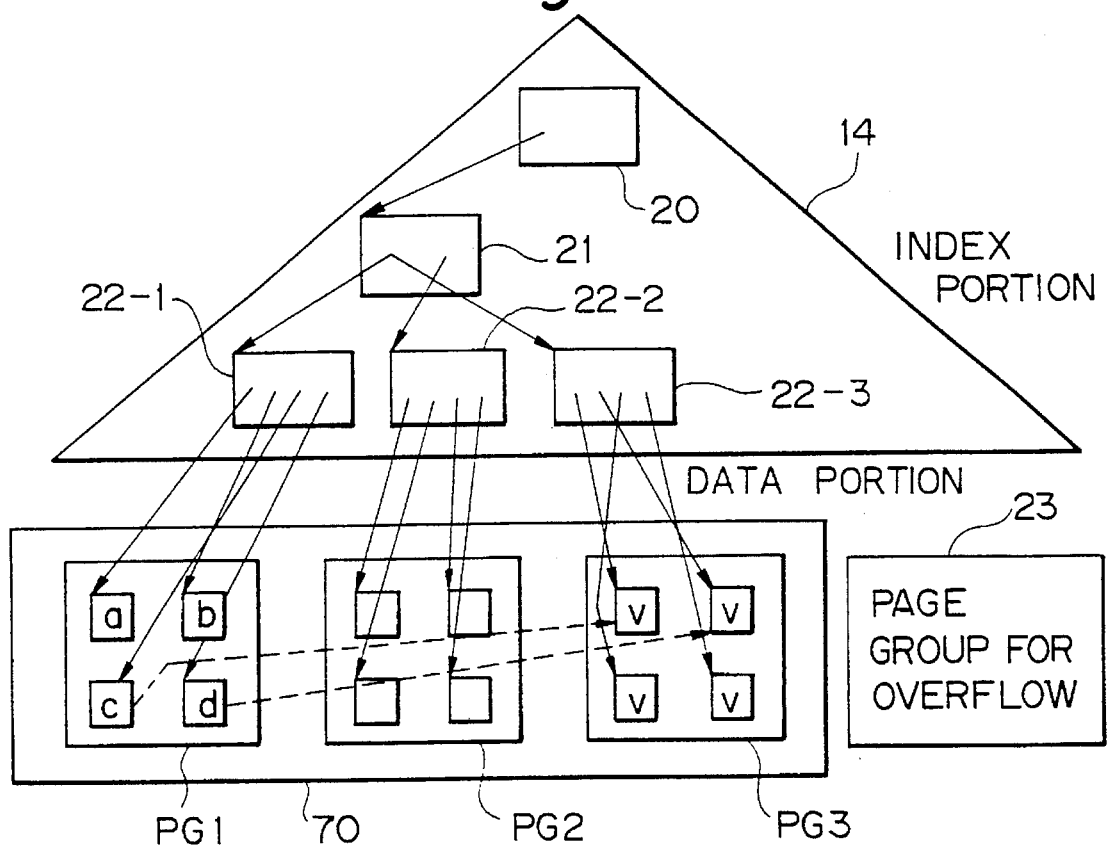
FIGS. 18 to 20 are explanatory views for a split process within a page group.
Figure 19:
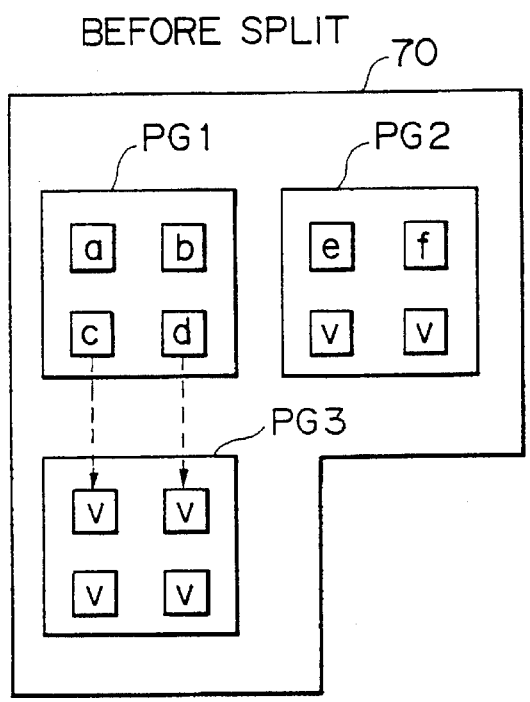
Figure 20:
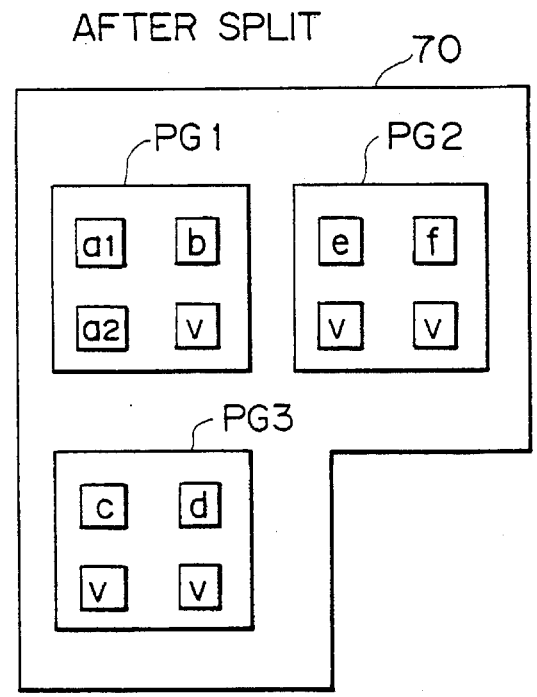

FIGS. 18 to 20 are explanatory views for a split process within the page group. FIG. 18 corresponds to the data base 13 in FIG. 9. FIG. 19 shows the upper page group before the split process, and FIG. 20 shows the upper page group after the split process. In FIGS. 19 and 20, the numerals denote the key value of the corresponding record (i.e., data). In FIG. 18, as shown in FIG. 9, reference number 20 denotes the upper page group index, 21 denotes the page group index, and 22 denotes the page index. In the page group, "a" to "f"denote the pages, and "v" denotes the vacant page. Reference number 70 denotes the upper page group.

When the page "a" of the page group PG1 is split, since there is no vacant page within the page group PG1, it is necessary to provide the page group split. Since there is a vacant page group (page group PG3) in the upper page group 70, the page split process is performed by utilizing this vacant page group of the page group PG3. That is, the pages "c" and "d" are moved to the page group PG3 after the above split process. As a result, since the vacant page occurs in the page group PG1, the page "a" is split into the pages "a1"and "a2" in the page group PG1 as shown in FIG. 20. Further, since the page group PG3 is increased, the key values of the pages "c" and "d" are placed in the page index. The maximum key value of the page group index 22-3 is placed in the page group index 21 as shown in FIG. 20.

FIGS. 21 to 23 are explanatory views for the page split process in use of the overflow area. FIG. 21 corresponds to the data base 13 in FIG. 9. FIG. 22 shows the upper page group before the page split, and FIG. 23 shows the upper page group after the page split.

When the split process in use of the temporary overflow is selected by the designation of the user, the split process using the overflow area 23 is performed. As a result of the split process, in the page "a" of the page group PG1, half of the record remains in the page group PG1, and half of the record moves to the vacant page for the overflow. Further, the object page of the page index 22-4 for managing the overflow area is set to the "in use" state of the overflow area. After the above split process, the page groups PG1 to PG3 and the page group 23 become as shown in FIG. 23.

Figure 24:
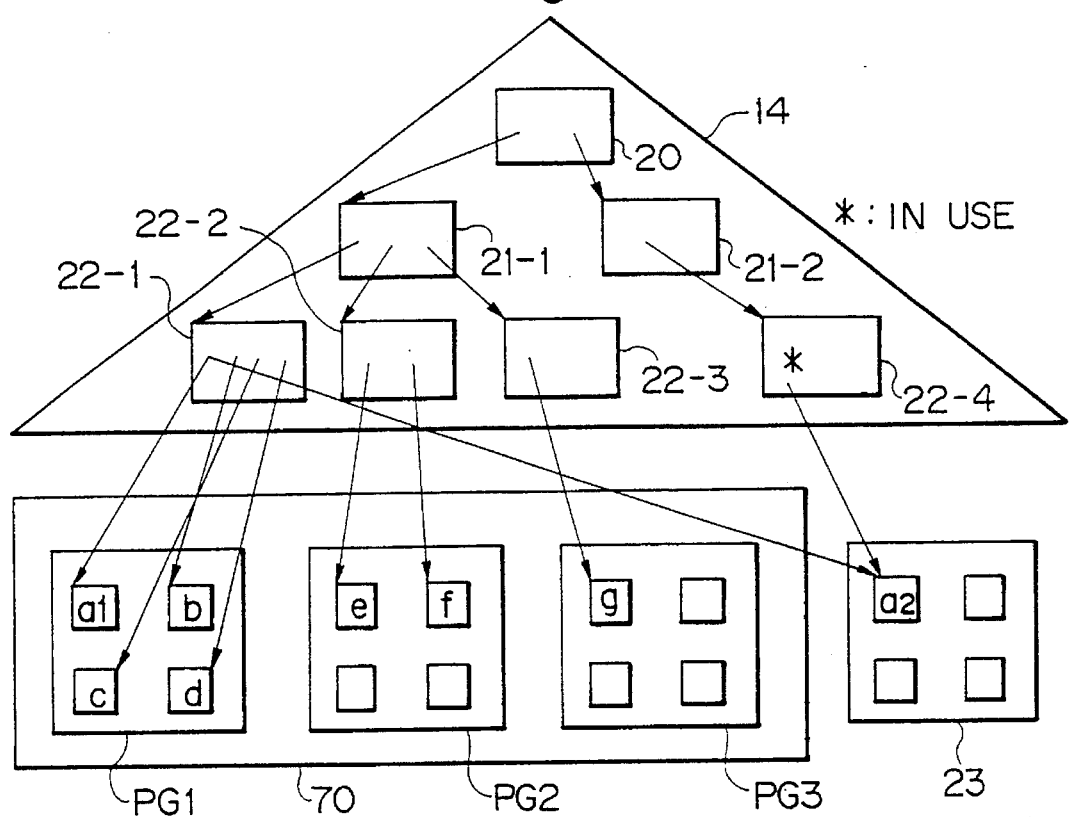
FIGS. 24 to 26 are explanatory views for a page group split process in a Demon processing process.
Figure 25:
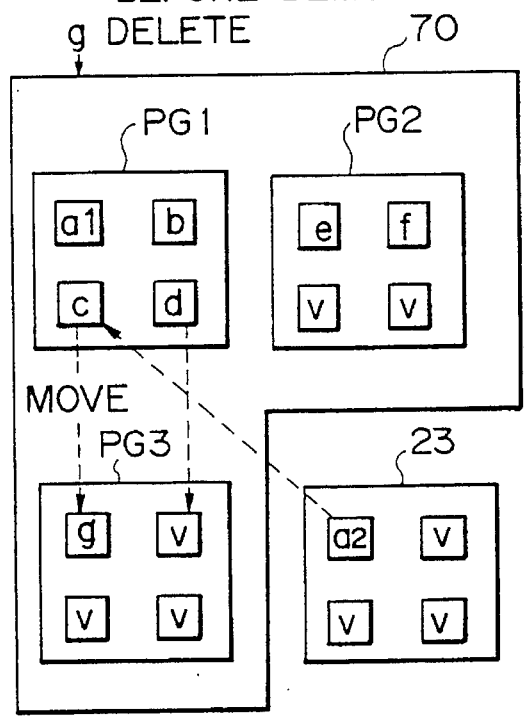
Figure 26:
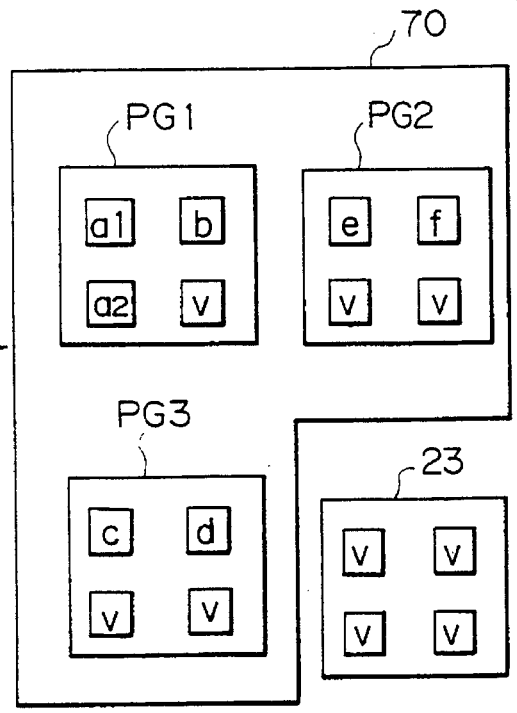

FIGS. 24 to 26 are explanatory views for a page group split process in the demon process. FIG. 24 shows the overall structure, FIG. 25 shows the upper page group before the Demon process, and FIG. 26 shows the upper page group after the demon process. In the index portion 14, the mark "," in the page index 22-4 denotes the "in use" state of the overflow area.

It is assumed that the record of the page "g" of the pages group PG3 is deleted so that this page becomes the vacant page, and the page group PG3 also becomes the vacant page group. In this case, the page "a2" split from the page group PG1 is set into the overflow area 23. Accordingly, when the Demon processing unit 12 operates after deletion of the record in the page "g", the Demon processing unit 12 performs the page group split process of the page group PG1. As a result, the pages "c"and "d" are moved to the page group PG3, and the page "a2" in the overflow area 23 is moved to the page group PG1. Further, the index of the page "a" for the overflow area is deleted from the page index page, and the split process is completed. Finally, the page group 23 used as the overflow area becomes completely vacant as shown in FIG. 26.

One example of the effect of the present invention is explained in detail below. In a magnetic disk apparatus, one cylinder may correspond to the upper page group, one track may correspond to the page group, and a record area corresponds to the page, respectively. Further, the characteristics of the magnetic disk apparatus may be given as follows.

seek time of a head to the cylinder: 20 ms rotation wait time: 8 ms track switch time: 3 ms data transfer time per one page: 3 ms data transfer time per one track: 10 ms record insertion time for one page: 50 μs split process time for one record in one page: 100 μs number of records in one page: 40 split time of one page: 2 ms (20×100 μs)

When the temporary overflow is performed by the present invention, the split process is not performed in the transaction process so that the total time becomes as follows.

rotation wait time +
data transfer time +
record insertion time = 8 ms/page × 1 page +
3 ms/page × 1 page + 50 μs
= about 11 ms In the B-tree structure not having a clustering structure and not depending on the Demon process, excluding the access to the page to be inserted, one page is retrieved to access the page to be split in the split process, and as a result, two pages are accessed in total. Further, to access the page, the track is switched, and the seek operation is effected. As a result, rotation wait time +
data transfer time +
page split time +
track switch time +
seek time = 8 ms/page × 2 page + 3 ms/page ×
2 page + 2 ms + 3 ms + 20 ms
= about 47 ms In the B-tree structure having a two-layer clustering structure and not depending on the Demon process, excluding the access to the page to be inserted, one page is retrieved to access the page to be splitted in the split process, as a result, two pages are accessed in total. Further, to access the page, the track is switched, but the seek operation is not effected. As a result, rotation wait time +
data transfer time +
page split time +
track switch time +
seek time = 8 ms/page × 2 page + 3 ms/page ×
2 page + 2 ms + 3 ms
= about 27 ms However, since the clustering structure is not the three layers and not depending on the Demon process of the present invention, the data transfer time corresponding to the number of pages in the page group is generated when the page group is split so that a large amount of time is required for the access as follows.

For example, when number of the track in the cylinder is given as 14, and the data are read out for every track, the following time is required.

14 tracks × (10 ms/track + 3 ms/track) =

182 ms as a page group split time.

Further, in the present invention, since the Demon process for the split process is performed after the transaction process, the process time in the CPU may be slightly increased. However, in general, since the process time of the CPU is a relatively small on-line process, the Demon process is performed in the remaining time of the on-line process so that there is no influence on the normal transaction process.

As a result of the above calculation, since the present invention has the three layers of the non-dense B-tree cluster structure as the management structure, and performs the split process under the Demon process, the response time of the split process when the page is filled with records is five times faster than the response time of the split process having the B-tree structure without the clustering structure. Further, the response time is three times faster than the B-tree structure having the clustering structure without the Demon process.

FIG. 27 is an explanatory view of a relationship between the non-dense cluster process and the Demon process. As explained above, the non-dense cluster unit is asynchronously operated with the Demon processing unit. The non-dense cluster process as a program includes the non-dense cluster unit, the page split unit, the page group split unit, the upper page group unit, the index unit and the split timing decision unit. The Demon process as the program includes the Demon processing unit, the page split unit, the page group split unit, the upper page group unit, the index unit, and the split timing decision unit. The processes are explained briefly by the steps (1) to (5).

(1) The Demon process is started by the data processing control process which controls the overall processes in the system of the start of the service.

(2) The non-dense cluster process is generated by the control process for every execution of an application program.

(3) The non-dense cluster process is started by the request of the process on the application program.

(4) The non-dense cluster process sends the trigger to the Demon process under the pre-split and temporary overflow when the data is inserted. The triggers are stored as the message, and supplied to the Demon process through the data processing control process.

(5) The Demon processing unit performs the demon process with reference to the trigger information.

The split timing decision unit performs the following control of the split process in accordance with the designation from the user.

(1) In the insertion stage, the decision unit selects the designation from the user regarding the split process as follows.

(a) The decision unit prohibits the split process to perform the temporary overflow. Then, the result of the temporary overflow is split in the Demon process.

(b) The decision unit does not prohibit the split process, and the split process is performed by the temporary overflow. Then, in the Demon process, the split page of the temporary overflow is moved to the page to be split.

(c) In the insertion stage, the decision unit immediately performs the split process.

(2) In the execution stage of the insertion, the decision unit selects the reference of the trigger for the Demon process.

(a) When the insertion of the pages reaches the previous split rate, the record insertion unit sends the trigger of the previous split to the Demon processing unit. The trigger of the previous split is utilized when the split process is previously executed before the temporary overflow is executed.

We claim:

1. A split control system for a page/page group in a data processing system which manages records of the page/page group based on a storage structure employing a non-dense B-tree cluster structure, comprising:

a data base including an index portion and a data portion, the index portion formed by layers consisting of the B-tree structure having at least one upper page group index, a plurality of page group indexes each operatively connected to the upper page group index, and a plurality of page indexes each operatively connected to a corresponding page group index for managing key values of the records, and the data portion formed by a plurality of upper page groups each operatively connected to a corresponding page group index and having an overflow area;

record insertion means operatively connected to the data base for inserting records into the page/page group by using the overflow area in a transaction process, and performing a pre-split process for the page/page group into further page/page groups by also using the overflow area when there are sufficient vacant pages for insertion into the page/page group; and Demon processing means operatively connected to the data base and operated asynchronously with the transaction process for retrieving a state of the use of the overflow area, performing a normal split process for the page/page group when the overflow area is in use, and a moving split page/page group from the overflow area to the page/page group, wherein a timing of a normal split process in the B-tree structure is temporarily delayed by using the overflow area so that it is possible to effectively balance an overhead time of the split process and to improve a response time returned by pre-split process to the transaction process.

2. A split control system as claimed in claim 1, further comprising:

a page split unit splitting a page when the page is filled with records;

a page group split unit splitting a page group when the page group is filled with records;

an upper page group split unit splitting an upper page group when the upper page group is filled with the records;

an index unit accessing the index portion; and a split timing decision unit determining the timing of the normal split process, the page split unit, the page group split unit, the upper page group split unit, the index unit, and the split timing decision unit being operatively connected to the record insertion means and the Demon processing means, and the split timing decision unit being operatively connected to the page split unit, the page group split unit, and the upper page group split unit.

3. A split control system as claimed in claim 1, wherein the three layers of the B-tree structure correspond to a cylinder, a track and a record area of the magnetic disk apparatus, the upper page group corresponds to the cylinder, the page group corresponds to the track, and page corresponds to the record area, so that the key values also correspond to the cylinder, the track and the record area, respectively.

4. A split control system as claimed in claim 1, wherein the Demon processing means performs a previous split for a page/page group when the page/page group is filled with records in a range of a predetermined utilization rate of the page/page group to eliminate an undesirable normal split process in the transaction process.

\* \* \* \* \*

UNITED STATES PATENT AND TRADEMARK OFFICE
CERTIFICATE OF CORRECTION

PATENT NO. : 5,568,638
DATED : October 22, 1996
INVENTOR(S) : Katzumi HAYASHI, et al.

It is certified that error appears in the above-indentified patent and that said Letters Patent is hereby corrected as shown below:

Col. 10, line 64, change "," to --*--.

Signed and Sealed this

Twenty-eighth Day of January, 1997

Attest:

BRUCE LEHMAN

*Attesting Officer*   *Commissioner of Patents and Trademarks*